United States Patent
Hou

(10) Patent No.: US 8,802,001 B2
(45) Date of Patent: Aug. 12, 2014

(54) CUSTOMIZED LUGGAGE BAG AND VACUUM FORMING METHOD THEREOF

(76) Inventor: I-Shun Hou, Guangdong (CN)

(*) Notice: Subject to any disclaimer, the term of this patent is extended or adjusted under 35 U.S.C. 154(b) by 270 days.

(21) Appl. No.: 13/254,694

(22) PCT Filed: Nov. 4, 2009

(86) PCT No.: PCT/CN2009/074776
§ 371 (c)(1),
(2), (4) Date: Sep. 2, 2011

(87) PCT Pub. No.: WO2010/099686
PCT Pub. Date: Sep. 10, 2010

(65) Prior Publication Data
US 2011/0308907 A1 Dec. 22, 2011

(30) Foreign Application Priority Data
Mar. 2, 2009 (CN) .......................... 2009 1 0105880

(51) Int. Cl.
*B29C 51/30* (2006.01)
(52) U.S. Cl.
USPC .......................................... 264/553; 190/124
(58) Field of Classification Search
USPC ................................................ 264/553, 571
See application file for complete search history.

(56) References Cited

U.S. PATENT DOCUMENTS

| | | | | |
|---|---|---|---|---|
| 4,769,100 A * | 9/1988 | Short et al. | .................... | 156/285 |
| 5,271,563 A * | 12/1993 | Cerny et al. | .................... | 239/463 |
| 5,604,006 A * | 2/1997 | Ponchaud et al. | .............. | 428/67 |
| 5,685,451 A * | 11/1997 | Newby, Sr. | .................... | 220/675 |
| 5,894,007 A * | 4/1999 | Younessian et al. | .......... | 264/522 |
| 6,177,093 B1 * | 1/2001 | Lombardi et al. | ............. | 424/401 |
| 6,257,866 B1 * | 7/2001 | Fritz et al. | .................. | 425/387.1 |
| 6,325,189 B1 * | 12/2001 | King et al. | .................... | 190/119 |
| 2004/0083918 A1 * | 5/2004 | Jack | ............................. | 101/485 |
| 2006/0108704 A1 * | 5/2006 | Geiwald et al. | ............... | 264/132 |
| 2009/0180712 A1 * | 7/2009 | Pollack et al. | ................ | 382/285 |

\* cited by examiner

*Primary Examiner* — Matthew Daniels
(74) *Attorney, Agent, or Firm* — Rosenberg, Klein & Lee

(57) ABSTRACT

The instant disclosure relates to a customizable vacuum molding method for forming personalized luggage bags utilizing a customizable vacuum molding device having a main mold body (1) and a personalized pattern module (2) customized to suit a customer preference. The vacuum molding method comprising the steps of: 1) placing the personalized pattern module on a molding surface of the main mold body at a predetermined location; 2) placing a plastic luggage bag substrate onto the molding surface of the vacuum molding device and soften the substrate by heating; and 3) generating negative pressure in the vacuum molding device and stretching the plastic substrate onto the personalized pattern module on the molding surface of the main mold body while cooling the plastic substrate to form a personalized pattern. The instantly disclosed vacuuforming method provides a simple yet cost effective solution for manufacturing luggage bags having personalized patterns of a customer's choice.

6 Claims, 2 Drawing Sheets

CUSTOMIZED LUGGAGE BAG AND VACUUM FORMING METHOD THEREOF

BACKGROUND OF THE INVENTION

1. Field of the Invention

The instant disclosure relates generally to a luggage bag and a forming method thereof, and pertains particularly to a luggage bag having customized patterns and the vacuuforming method thereof.

2. Description of Related Art

Conventional vacuum-molded plastic luggage bags are created in a molding device having integrally embedded patterns formed thereon. A flat thermoplastic substrate is heated and stretched onto the pattern-embedded mold through vacuuming. The plastic substrate is then cooled to form the desirable patterned shape of a bag. In general, the cost for creating a mold unit is often exceptionally expensive, and a permanent mold can only mass-produce products with a single pattern. Therefore, conventional vacuum molding techniques and the molding devices thereof fall short in providing the customization flexibility that modern consumers desire.

SUMMARY OF THE INVENTION

Embodiments of the instant disclosure provide a luggage bag having customized patterns and the vacuuforming method thereof.

A method in accordance with an embodiment of the instant disclosure provides a customizable vacuum molding method for forming personalized luggage bags utilizing a customizable vacuum molding device having a main mold body (1) and a personalized pattern module (2) customized to suit a customer preference, the vacuum molding method comprising the steps of:

1) placing the personalized pattern module (2) on a molding surface of the main mold body (1) at a predetermined location;

2) placing a plastic luggage bag substrate onto the molding surface of the vacuum molding device and soften the substrate by heating; and 3) generating negative pressure in the vacuum molding device and stretching the plastic substrate onto the personalized pattern module (2) on the molding surface of the main mold body (1) while cooling the plastic substrate to form a personalized pattern.

The method of creating the personalized pattern module (2) involves the following steps:

a. building a customer pattern database by gathering customer preference at a point of sale; and b. utilizing a computer numerical control (CNC) cutting machine to create a plurality of personalized pattern modules (2) having different mold patterns according to the customer pattern database.

Preferably, the operational temperature range in step 2) is controlled between 200~250 degrees Celsius, and the operational pressure range in step 3) is controlled between –0.60~–0.65 MPa.

In order to enhance the three-dimensional effect a positive molding pattern, the personalized pattern module (2) may be shaped as an integral personalized pattern having uniform thickness, wherein the thickness is ranged from 1 mm~10 mm. Alternatively, the personalized pattern module (2) may comprise at least two pattern portions of different thickness, wherein the thickness of each portion ranges from 1~10 mm, thereby providing the customized pattern created there-from a sense of layer.

In order to enhance the concave effect of a negative molding pattern, the main mold body (1) may comprise a concave seating portion (11) for positioning the personalized pattern module (2), wherein the personalized pattern module (2) is a slab mold having a concave pattern (23) arranged thereon with the outer shape thereof coincidentally adaptable into the concave seating portion (11) of the main mold body.

A personalized luggage bag made by the instantly disclosed vacuum molding method comprises a bag body (2) having a customized pattern (3) designated by a customer, with the customized pattern (3) being an integrally formed portion of the bag body (5).

The customized pattern (3) on the personalized luggage bag may include words, pictures, symbols, or the combination thereof, preferably customized for the customers.

For positively molded patterns, the customized pattern (3) comprises at least one pattern portion, with each pattern portion being positively molded and protruding above the surface of the bag body (5) at substantially uniform height. Moreover, when the customized pattern (3) has more than one pattern portions, each of the pattern portions protrudes above the surface of the bag body (5) at different heights, thereby providing the customized pattern (3) a sense of layer For negatively molded patterns, the customized pattern (3) may be concavely formed on the surface of the bag body (5), with the concavity of the customized pattern (3) being of the same or different depth.

Comparing with conventional techniques, the utilization of a cheaper temporary personalized molding module in combination with a permanent main mold body to form an integrated vacuuforming mold device provides a more customizable, flexible, and cost-effective molding solution. The replaceable design of the personalized molding module in the instantly disclosed vacuuforming method provides a simple yet cost effective solution for manufacturing luggage bags having personalized patterns of a customer's choice, providing brighter commercial future.

DETAILED DESCRIPTION OF THE PREFERRED EMBODIMENTS

The instant disclosure will be described more specifically with reference to the following embodiments. It is to be noted that the following descriptions of preferred embodiments are provided herein for purpose of illustration and description. It is not intended to be exhaustive or limiting to the precise form disclosed.

Figure 1:
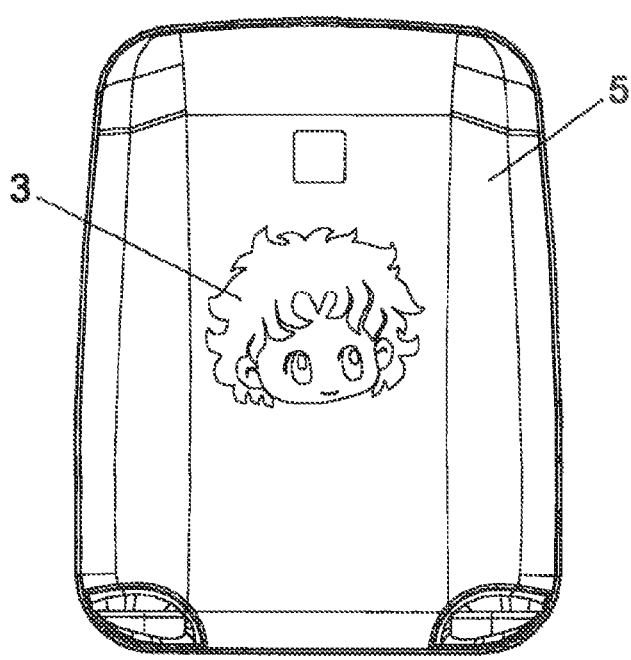
FIG. 1 shows a structural layout of a luggage bag in accordance with the instant disclosure.

Please refer to FIG. 1. A personalized luggage bag made by the instantly disclosed vacuum molding method comprises a bag body (5), which is characterized by a customer-designated customized pattern (3) formed on the outer surface thereof. The customized pattern (3) is an integrally formed portion of the bag body (5). The customized pattern (3) on the personalized luggage bag may include words, pictures, symbols, or the combination thereof, such as a customer's name or his/her favorite cartoon character. For positively molded patterns, the customized pattern (3) comprises at least one pattern portion, with each pattern portion being positively molded and protruding above the surface of the bag body (5) at substantially uniform height. Moreover, when the customized pattern (3) has more than one pattern portions, each of the pattern portions protrudes above the surface of the bag body (5) at different heights, thereby providing the customized pattern (3) a sense of layer. For negatively molded patterns, the customized pattern (3) may be concavely formed on the surface of the bag body (5), with the concavity of the customized pattern (3) being of the same or different depth.

Figure 5:
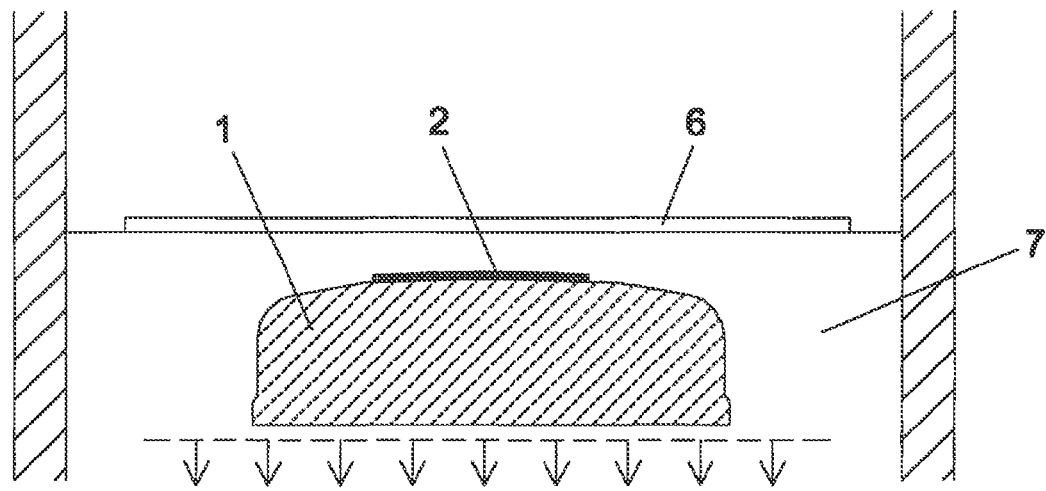
FIG. 5 illustrates the arrangement of a customizable vacuum molding device in accordance with the instant disclosure for generating a positive (convex) molding pattern.

The vacuum molding method for forming customized luggage bags in accordance with the instant disclosure is realized by utilizing a customizable vacuum molding device as illustrated in FIG. 5 to generate customized luggage bag components for final assembly. The customizable vacuum molding device comprises a main mold body (1) and a personalized pattern module (2). The customizable vacuum molding method comprising the following steps:

1) First, place the personalized pattern module (2) of choice on a molding surface of the main mold body (1) at a predetermined location to form a temporary combination mold;

2) Then, place a plastic luggage bag substrate (6) onto the molding surface of the vacuum molding device and soften the substrate by heating. Preferably, the operational temperature range is controlled between 200~250 degrees Celsius.

3) Subsequently, generate negative pressure in the molding chamber (7) of the vacuum molding device and stretching the plastic substrate onto the personalized pattern module (2) on the molding surface of the main mold body (1) while cooling the plastic substrate to form a personalized pattern. Preferably, the operational pressure range is controlled between −0.60~−0.65 MPa.

For creating a luggage bag having a different pattern, simply take out the personalized molding module (2) of previous selection from the main mold body (1), replace it with another personalized molding module having a different pattern, and repeat the steps recited above to create the customized components for another personalized luggage bag with a different pattern style. The luggage bag components are subsequently put together through assembly lines to form the finalized product.

The fabrication of the personalized molding module (2) in accordance to the need of a customer may include the following steps:

a. build a customer pattern database by gathering customer preference at a point of sale, such as at a market place, a wholesale store, or a retail store. The customer preference database may contain customized patterns that are personally designed, or otherwise selected by a customer from a prepared list, or patterns that are particularly customized for the customer, and b. according to the customer pattern database, utilize a computer numerical control (CNC) cutting machine (such as computer controlled laser cutting machine) to create personalized molding modules (2) having mold patterns of different styles.

Figure 6:
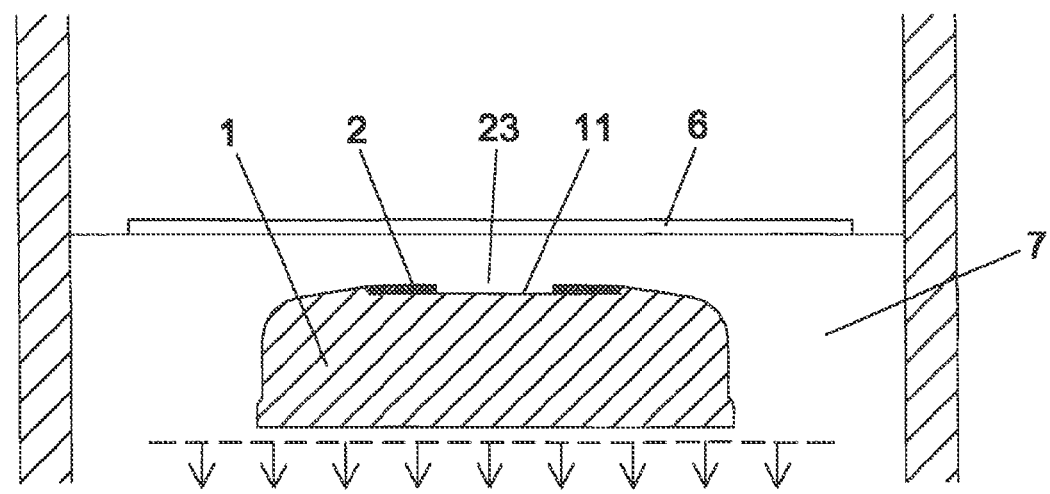
FIG. 6 illustrates the arrangement of a customizable vacuum molding device in accordance with the instant disclosure for generating a negative (concave) molding pattern.

The material for the personalized molding modules (2) may be of varying hardness, such as polyvinyl chloride (PVC) plastic, Thermoplastic polyurethanes (TPU) plastic, leather, acrylic, or cardboard. In general, personalized molding modules made of softer material are equally suitable for adapting onto flat and curved molding surfaces, while molding modules made of harder material are more suitable for adapting onto a flat molding surface. The thickness of the personalized pattern module (2) may range from 1~10 mm, preferably between 1~3 mm. In order to enhance the three-dimensional effect a positive molding pattern, the personalized pattern module (2) may be shaped as an integral personalized pattern having uniform thickness. Alternatively, the personalized pattern module (2) may be formed by combining two or more pattern portions of different thicknesses to further enhance the sense of layer in a resultant pattern. On the other hand, in order to enhance the concave effect of a negative molding pattern, such as illustrated by FIG. 6, the main mold body (1) may comprise a concave seating portion (11) for positioning the personalized pattern module (2). Specifically, the personalized pattern module (2) may be a slab mold having a concave pattern (23) formed thereon that corresponds to a concave portion of a customized pattern (3) (as shown in FIG. 1). Moreover, the outer shape thereof coincidentally adaptable into the concave seating portion (11) of the main mold body. Likewise, the depth of concavity on each portion of the personalized pattern (3) may vary, depending on a particular need or preference.

Figure 2:
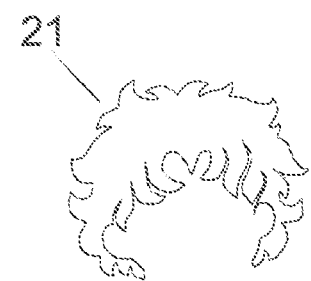
FIG. 2 shows a pattern of a first personalized pattern module in accordance with the instant disclosure.
Figure 3:
FIG. 3 shows a pattern of a second personalized pattern module in accordance with the instant disclosure.
Figure 4:
FIG. 4 shows the combination of the first and the second personalized patter modules in forming a customized pattern.

In one embodiment, as shown in FIGS. 2-4, the personalized molding module (2) comprises a first personalized pattern unit (21) having a thickness of 2 mm and a second personalized pattern unit (22) having a thickness of 1 mm. Each of the personalized pattern unit is formed and cut respectively, and correspondingly pasted onto a polyethylene (PE) film or tape, thereby forming an integrated personalized pattern unit (2) having a pattern layer of two distinct thicknesses.

The vacuum molding method in accordance with the instant disclosure utilizes a cheaper personalized molding module in combination with a main mold body to form an integrated vacuuforming mold device to provide a more customizable, flexible, and cost-effective molding solution. The replaceable design of the personalized molding module enables convenient and low cost customization of artistic patterns on a plastic luggage bag, thereby minimizing mold-related manufacturing cost and maximizes product customizability to fulfill the needs of different customers.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A customizable vacuum molding method for forming personalized luggage bags utilizing a customizable vacuum molding device having a main mold body and a personalized pattern module customized to suit a customer preference, the vacuum molding method comprising the steps of:

1) placing the personalized pattern module on a molding surface of the main mold body at a predetermined location;

2) placing a plastic luggage bag substrate onto the molding surface of the vacuum molding device and soften the substrate by heating;

3) generating a partial vacuum in the vacuum molding device and stretching the plastic substrate onto the personalized pattern module on the molding surface of the main mold body while cooling the plastic substrate to form a personalized pattern;

4) building a customer pattern database by gathering customer preference at a point of sale; and 5) utilizing a computer numerical control (CNC) cutting machine to create a plurality of personalized pattern modules having different mold patterns according to the customer pattern database;

wherein the personalized pattern module includes at least two pattern portions of different thicknesses each ranging from 1 to 3 mm thereby providing a customized pattern created therefrom a sense of layering.

2. The vacuum molding method for forming personalized luggage bag as claimed in claim 1, wherein the heating temperature of step 2) is controlled in the range of 200 to 250° C.

3. The vacuum molding method for forming personalized luggage bag as claimed in claim 1, wherein the main mold body comprises a concave seating portion for positioning the personalized pattern module, wherein the personalized pattern module is a slab mold having a concave pattern arranged thereon with the outer shape thereof coincidentally adaptable into the concave seating portion of the main mold body.

4. The vacuum molding method for forming personalized luggage bag as claimed in claim 1, wherein the customized pattern being words, pictures, symbols, or the combination thereof.

5. The vacuum molding method for forming personalized luggage bag as claimed in claim 4, wherein the customized pattern comprises at least one pattern portion, each pattern portion being positively molded and protruding above the surface of the bag body at substantially uniform height, wherein when the customized pattern has more than one pattern portions, each of the pattern portions protrudes above the surface of the bag body at different heights, thereby providing the customized pattern a sense of layer.

6. The vacuum molding method for forming personalized luggage bag as claimed in claim 4, wherein the customized pattern is concavely formed and molded with at least one concavity on the surface of the bag body, wherein the at least one concavity of the customized pattern is of the same or different depth with respect to another concavity of the customized pattern.

* * * * *